US012312000B2

(12) United States Patent
Partyka et al.

(10) Patent No.: US 12,312,000 B2
(45) Date of Patent: May 27, 2025

(54) INTERMEDIATE SHAFT AXIAL RETENTION DEVICE

(71) Applicant: Steering Solutions IP Holding Corporation, Saginaw, MI (US)

(72) Inventors: Michael E. Partyka, Saginaw, MI (US); Daniel P. Cook, Saginaw, MI (US); David G. Matousek, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/400,188

(22) Filed: Dec. 29, 2023

(65) Prior Publication Data

US 2024/0132138 A1 Apr. 25, 2024

Related U.S. Application Data

(62) Division of application No. 17/017,883, filed on Sep. 11, 2020, now Pat. No. 12,097,897.

(51) Int. Cl.
*B62D 1/185* (2006.01)
*F16C 3/02* (2006.01)
*F16C 3/03* (2006.01)
*F16D 1/10* (2006.01)
*F16D 3/06* (2006.01)

(52) U.S. Cl.
CPC .............. *B62D 1/185* (2013.01); *F16C 3/023* (2013.01); *F16C 3/03* (2013.01); *F16D 3/06* (2013.01); *F16C 2226/52* (2013.01); *F16C 2326/24* (2013.01); *F16D 2001/103* (2013.01); *Y10T 29/49929* (2015.01); *Y10T 403/32475* (2015.01); *Y10T 403/7033* (2015.01)

(58) Field of Classification Search
CPC .......................... F16D 2001/103; B62D 1/185
See application file for complete search history.

(56) References Cited

U.S. PATENT DOCUMENTS 8,491,408 B2 * 7/2013 Beach .................... A63B 53/10
473/296
9,157,482 B2 * 10/2015 Vasicek ..................... B62D 1/20
10,989,294 B2 * 4/2021 Souers .................... F16D 1/108

FOREIGN PATENT DOCUMENTS

JP 2004217095 A 8/2004
JP 2011117496 A 6/2011

OTHER PUBLICATIONS

Office Action regarding corresponding DE App. No. 10 2021 123 273.2; dated May 31, 2024.

* cited by examiner

*Primary Examiner* — Jacob J Cigna
(74) *Attorney, Agent, or Firm* — Dickinson Wright PLLC

(57) ABSTRACT

A steering shaft assembly includes a male shaft having a plurality of splines formed thereon, each of the splines terminating at a spline end, wherein each of the spline ends form an angle of about 90 degrees relative to a longitudinal direction of the splines. The steering shaft assembly also includes a female shaft including a plurality of stakes located proximate an end of the female shaft, the stakes retaining the male shaft at an interface between the stakes and the spline ends.

6 Claims, 6 Drawing Sheets

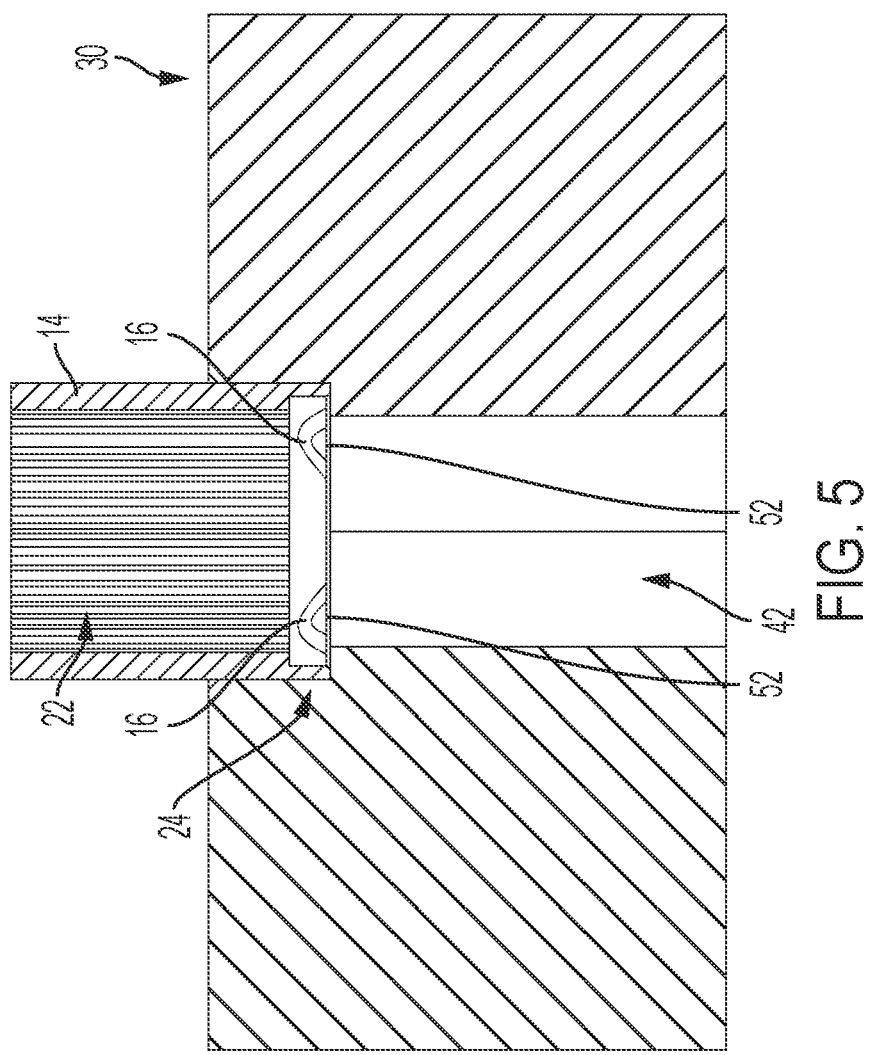

INTERMEDIATE SHAFT AXIAL RETENTION DEVICE

CROSS-REFERENCE TO RELATED APPLICATION

This application is a divisional application of, and claims the benefits of priority to, U.S. application Ser. No. 17/017,883, filed Sep. 11, 2020, the disclosure of which is incorporated by reference herein in its entirety.

FIELD OF THE INVENTION

The present disclosure relates to vehicle steering systems and, more particularly, to an intermediate shaft axial retention assembly for steering systems, as well as methods of making and assembling such an assembly.

BACKGROUND

Vehicle steering systems include a steering shaft assembly that couples a handwheel to one or more components that facilitate steering control of a vehicle. The steering shaft assembly often includes multiple shafts, with one being referred to as an intermediate shaft.

One of the characteristics of an intermediate shaft is its ability to transfer torque and provide axial displacement without the possibility of becoming separated. To achieve transference of torque with a high torsional rate, all slip joint shaft designs require a line-to-line tight fit while still maintaining a low stroke load. Currently stakes are used to retain a male shaft inside a female tube to prevent the two shafts from becoming detached during shipping, handling and assembly in a vehicle. Recently, some vehicle suppliers and manufacturers have increased the stake pull apart requirements due to assembly requirements. For example, the stakes may be required to hold 2.5 times the mass of the column with less than a 60 N breakaway load. In in another example, the stakes may be required to hold 1000 N for 20 seconds with less than a 40 N breakaway load when collapsed from full extension. For ergonomic requirements during in vehicle assembly, no sticking or high stroke loads are allowed which could result in a no build situation. With current stake processes, a slip joint will lock up when pushed in from full extension exceeding the breakaway collapse requirement.

SUMMARY

According to one aspect of the disclosure, a steering shaft assembly includes a male shaft having a plurality of splines formed thereon, each of the splines terminating at a spline end, wherein each of the spline ends form an angle of about 90 degrees relative to a longitudinal direction of the splines. The steering shaft assembly also includes a female shaft including a plurality of stakes located proximate an end of the female shaft, the stakes retaining the male shaft at an interface between the stakes and the spline ends.

According to another aspect of the disclosure, a steering shaft assembly includes a male shaft having a plurality of splines formed thereon, each of the splines terminating at a spline end. The steering shaft assembly also includes a female shaft having a splined portion and an end region, the splined portion defined along an interior surface of the female shaft and mated with the splines of the male shaft, wherein the end region has a smaller thickness than the splined portion, the female shaft having a plurality of stakes located within the end region, the stakes retaining the male shaft at an interface between the stakes and the spline ends.

According to yet another aspect of the disclosure, a method of manufacturing a steering shaft assembly is provided. The method includes axially inserting an end region of a female shaft into a stake forming tool aperture of a stake forming tool. The method also includes stopping axial insertion of the end region into the stake forming tool aperture with a step to prevent insertion of a splined portion of the female shaft into the stake forming tool aperture. The method further includes forming a plurality of stakes within the end region of the female shaft to provide a retention feature on the female shaft for a male shaft inserted therein.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5 is a cross-sectional view of the steering shaft assembly being formed by shearing of material.

DETAILED DESCRIPTION

Referring now to the Figures, where the invention will be described with reference to specific embodiments, without limiting same, a retention feature for a vehicle steering shaft assembly is illustrated.

Figure 1:
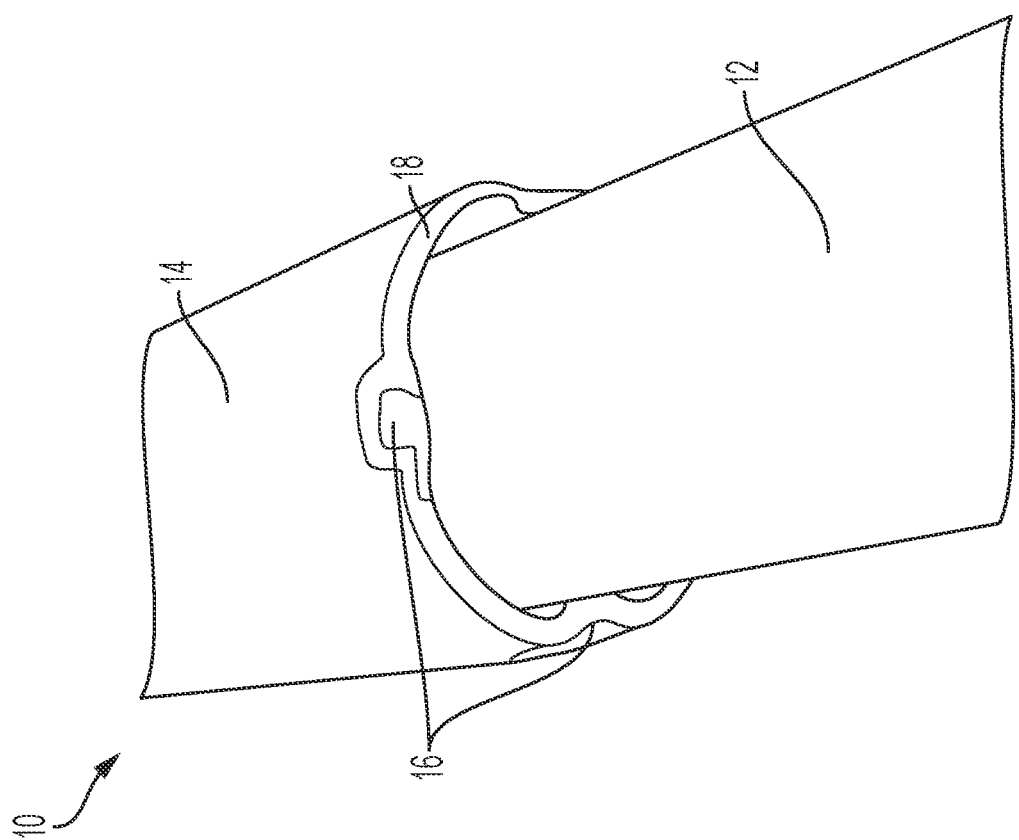
FIG. 1 is a perspective view of a portion of a steering shaft assembly.

Referring to FIG. 1, a vehicle steering shaft assembly is partially shown and referenced generally with numeral 10. The steering shaft assembly 10 includes, in part, a male shaft 12 and a female shaft 14. The male shaft 12 is inserted partially within the female shaft 14 and is retained therein. While various shaft assembles are contemplated to benefit from the embodiments disclosed herein, one aspect of the disclosure relates to an intermediate shaft assembly of a vehicle steering system.

Figure 2:
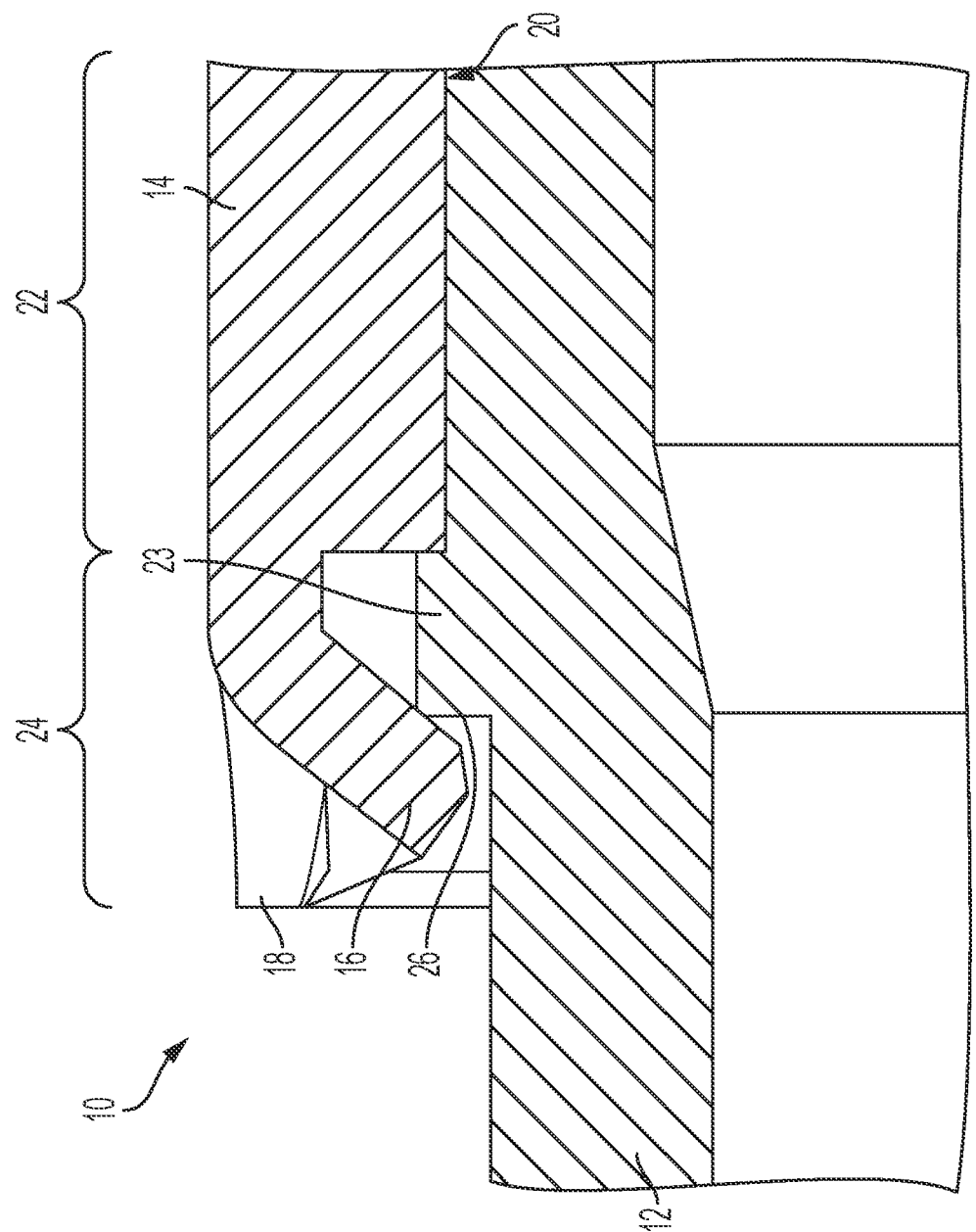
FIG. 2 is an elevational, cross-sectional view of an interface region of the steering shaft assembly.

As shown from the exterior of the female shaft 14 in FIG. 1, and in a cross-sectional view in FIG. 2, the female shaft 14 includes a plurality of stakes 16 manufactured on the female shaft 14 at an end 18 of the female shaft 14 that receives the male shaft 12. As shown in FIG. 1, the plurality of stakes 16 are circumferentially spaced from each other around the end 18 of the female shaft 14. It is to be understood that various numbers of stakes 16 may be provided and spaced appropriately for the particular application of use.

To achieve the torque transmission between the male shaft 12 and the female shaft 14, a splined relationship is formed to join the male and female shafts 12, 14. As shown in FIG. 2, an interior surface 20 of the female shaft 14 defines the space for the male shaft 12 to be received within. A portion of the interior surface 20 is referred to as a splined portion 22, with longitudinally extending splines that mate with a male shaft splined portion 23. The splined portion 22 of the female shaft 14 does not extend completely to the end 18 of the female shaft 14 interior surface 20. The portion of the female shaft 14 between the end 18 of the female shaft 14 and the splined portion 22 is referred to as an end region 24. The end region 24 has a smaller thickness when compared to the splined portion 22 of the female shaft 14. The particular ratio of thicknesses may vary depending upon the particular application.

Figure 2A:
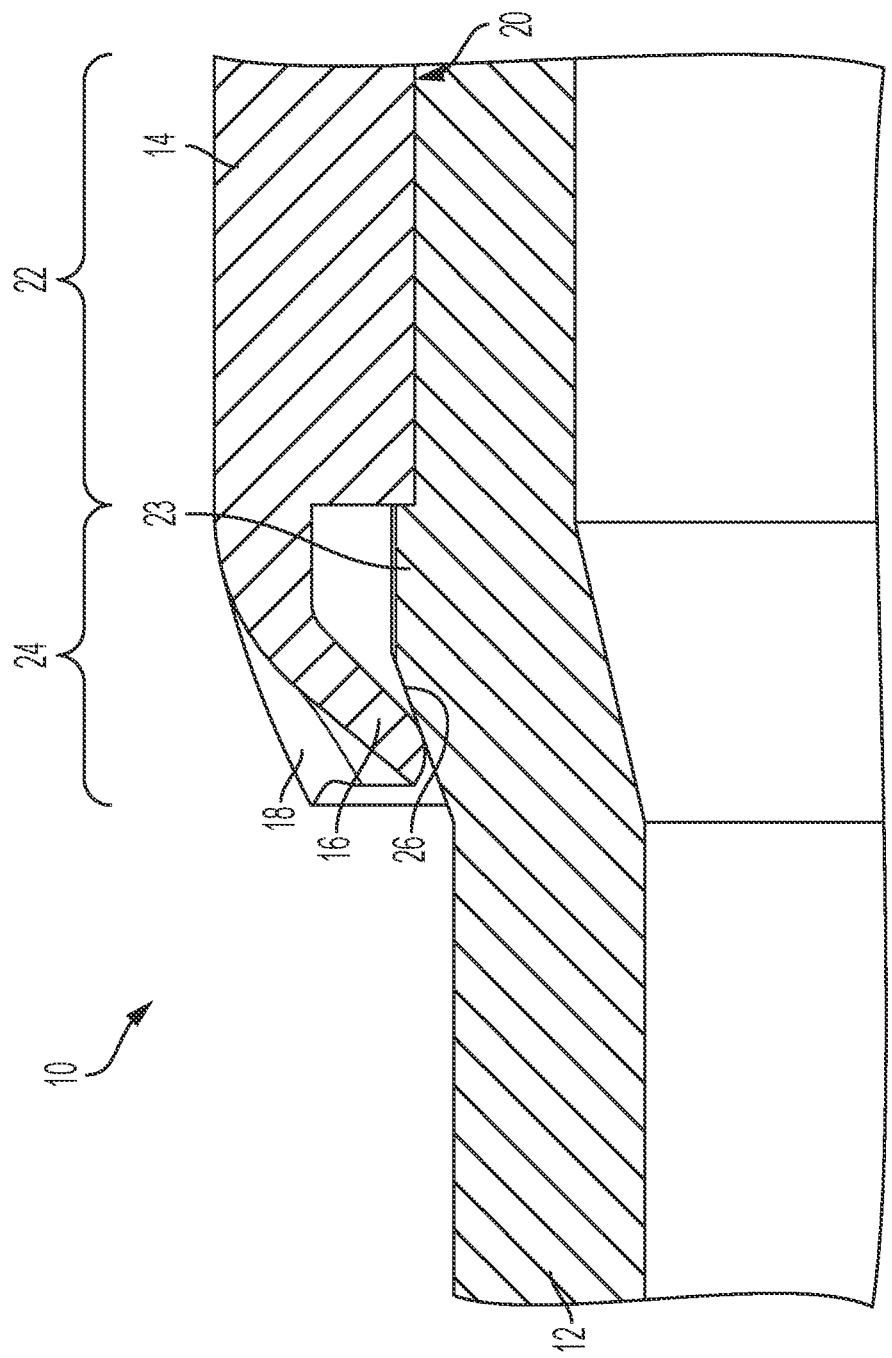
FIG. 2A is an elevational, cross-sectional view of the interface region of the steering shaft assembly according to another aspect of the disclosure.

The plurality of stakes 16 are formed within the end region 24 of the female shaft 14. In the illustrated embodiment of FIG. 2, the splines of the male shaft splined region 23 are not tapered at each of their respective ends, as utilized in other assemblies. Instead, the ends 26 of each of the splines of the male shaft splined region 23 are manufactured to be oriented at substantially 90 degree angles. Although described above and illustrated in FIG. 2 as having a substantially 90 degree angle, it is to be appreciated that the angle of the ends 26 of each of the splines of the male shaft splined region 23 are not limited to 90 degree angles, as shown in FIG. 2A. The hard stop on the ends 26 provides a positive hard stop for the male shaft 12, while also eliminating the possibility of locking up at the interface of the male shaft splines 23 and the plurality of stakes 16. While the angle of the hard stop may deviate from 90 degrees, as described above, it is to be understood that the ends 26 of the male splines may be greater than the angle of the stakes (i.e., "stake angle"). However, the male splines do not necessarily have to be greater than the angle of the stakes. Since the contact surface of the female shaft is smooth, wedging of the male shaft splines is prevented. For higher pull apart loads, increasing the spline angle improves greater holding loads.

By having a reduced thickness at the end region 24 of the female shaft 14, the female shaft 14 roundness deformation is minimized while improving the manufacturability of the retention features, which may also be referred to herein as anti-pull apart features.

Figure 3:
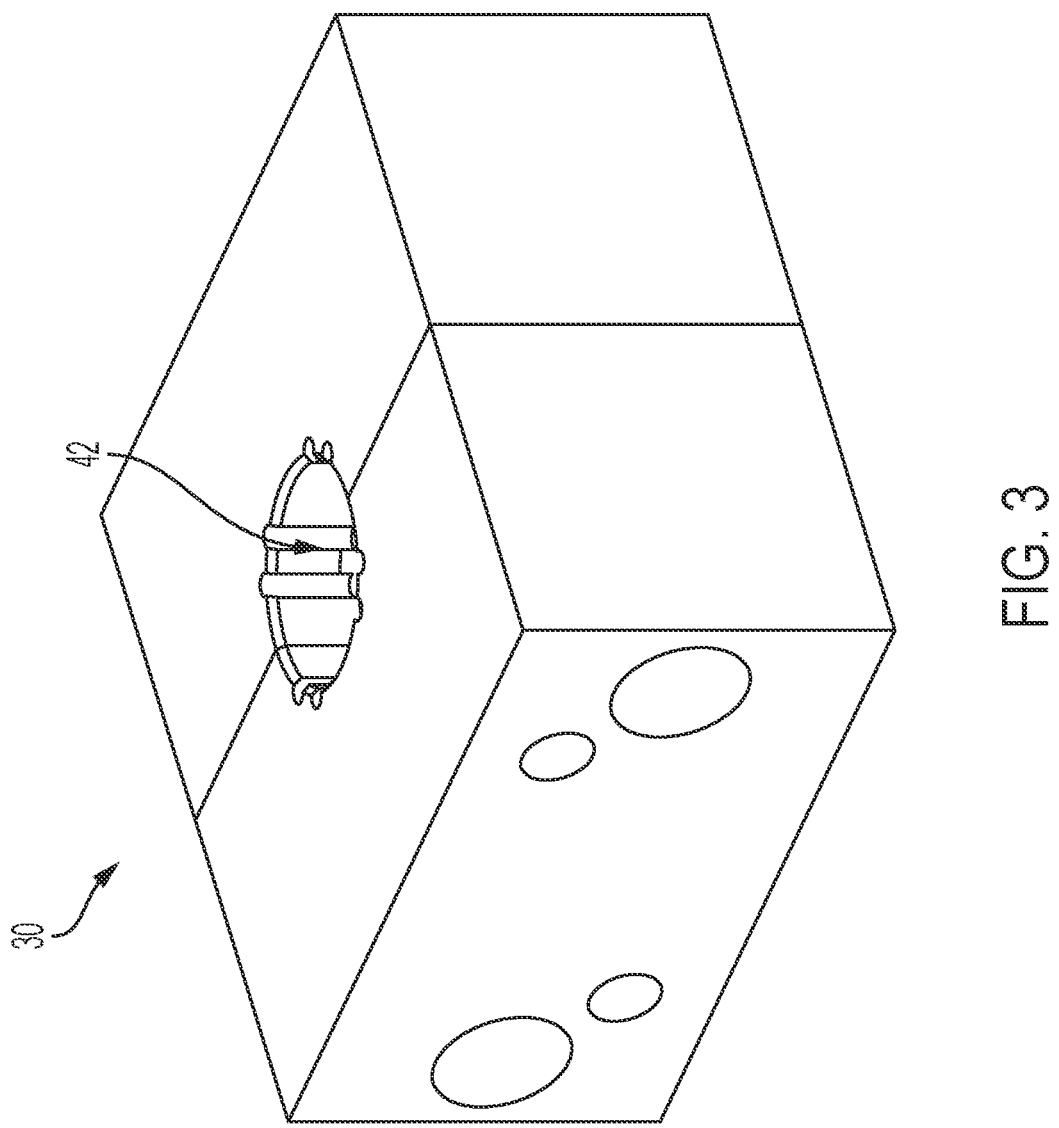
FIG. 3 is a perspective view of a two-piece stake tool in an assembled condition.
Figure 4:
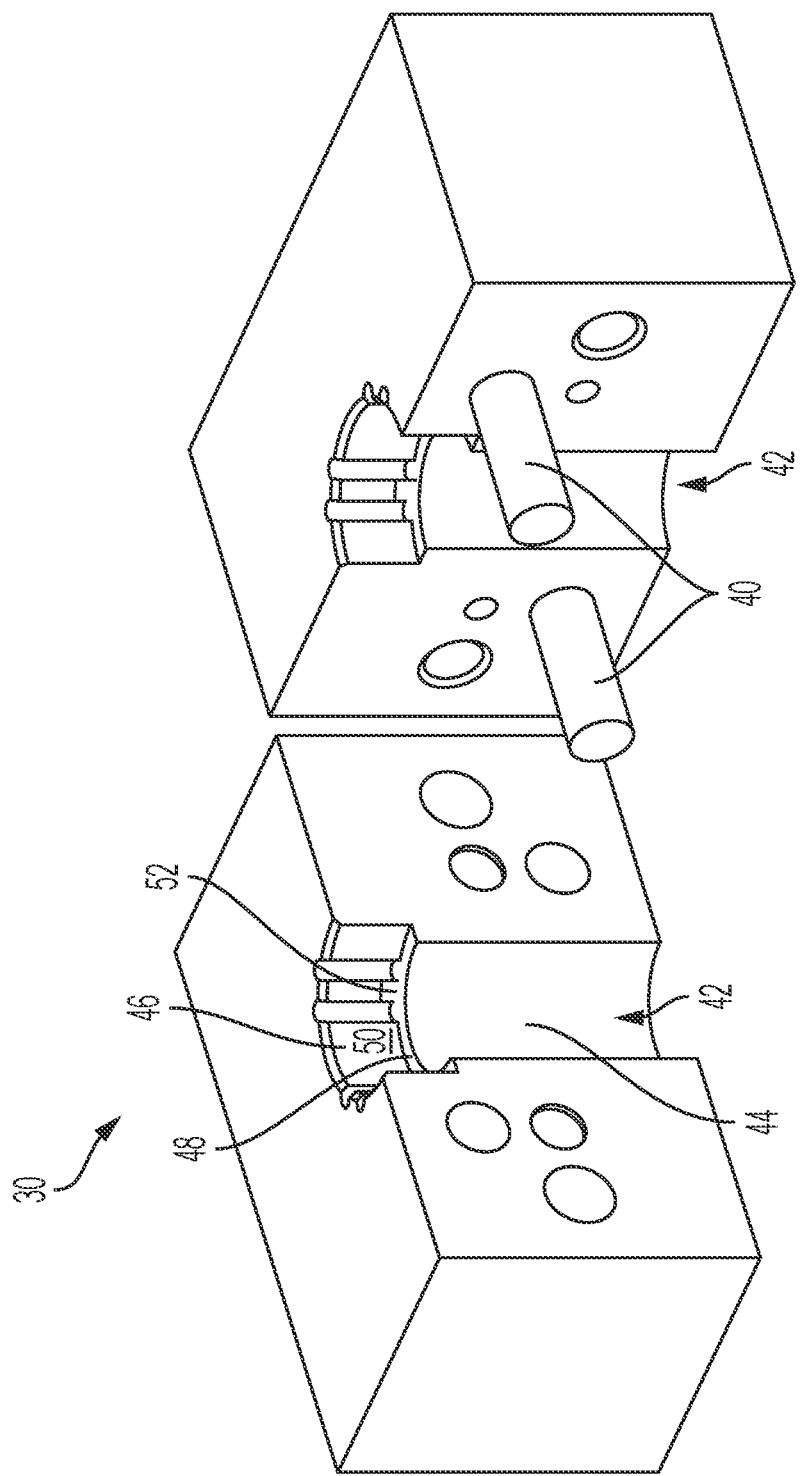
FIG. 4 is a perspective view of the two-piece stake tool in a disassembled condition.

Referring now to FIGS. 3-5, a process of manufacturing the female shaft 14 is illustrated. In particular, a two-piece stake forming tool 30 is shown. The stake forming tool 30 avoids deformation of the splined portion 22 of the female shaft 14, and provides the ability to withstand high pull apart forces imparted on the male shaft 12 and the female shaft 14, while maintaining a low collapse breakaway load of the steering shaft assembly 10. The stake profile is formed in one axial motion. As described above, the process requires the female shaft 14 wall thickness to be reduced at the staking area, i.e., the end region 24 of the female shaft 14. By having a reduced thickness at the stake region, as described above, the female shaft roundness deformation is minimized. The smooth contact surface on the end of female shaft 14 prevents the splined male shaft from locking up at the interface, but also improves tool life of the stake forming tool 30.

The stake forming tool 30 is shown in an assembled condition in FIG. 3 and in a disassembled condition in FIG. 4. At least one of the two pieces of the stake forming tool 30 includes at least one locating feature 40 to properly align and assemble the tool 30. The stake forming tool 30 defines an aperture 42 in the assembled condition. The aperture 42 is separated into a first segment 44 and a second segment 46. The first and second segments 44, 46 are separated by a step 48 that extends radially outwardly to provide a larger diameter for the second segment 46 of the aperture 42, when compared to the first segment diameter. The end region 24 of the female shaft 14 is inserted into the second segment 46 of the aperture 42, but has too large of a diameter to pass into the first segment 44. The step 48 defines a hard stop for the female shaft 14 during insertion (FIG. 5).

A wall 50 defining the second segment 46 of the aperture 42 includes stake forming protrusions 52 at or adjacent to the step 48 which form the plurality of stakes 16 of the female shaft 14 upon full insertion into the second segment 46 of the aperture 42. The wall 50 also includes additional structural features that facilitate formation of the plurality of stakes 16 in the desired size and orientation. The above-described insertion process that forms the stakes 16 do not impact the splined portion 22 of the female shaft 14.

The embodiments disclosed herein provide a consistent stake in the female shaft 14. The stake forming tool 30 provides a positive stop on the female shaft 14, thereby providing a consistent stake profile and minimizes the risk of contact with the male shaft 12, thereby avoiding the possibility of causing excessive noise and/or a high sliding load.

The assembly 10 provides a high load carrying capability. The evenly distributed contact between the shafts 12, 14 provides a positive hard stop with no possibility of becoming locked up in the female shaft 14 at full extension. Increased stake tool life is also achieved, as the thinner tube thickness results in reduced tool wear. Finally, no deformation of female shaft splined portion 22 results from the above-described process.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of manufacturing a steering shaft assembly comprising:
   axially inserting an end region of a female shaft into a stake forming tool aperture of a stake forming tool;
   stopping axial insertion of the end region into the stake forming tool aperture with a step to prevent insertion of a splined portion of the female shaft into the stake forming tool aperture;
   forming a plurality of stakes within the end region of the female shaft to provide a retention feature on the female shaft for a male shaft inserted therein, wherein each of the plurality of the stakes extend radially inwardly; and
   forming a plurality of spline ends on a plurality of splines of the male shaft at an angle relative to a longitudinal direction of the splines that is greater than a stake angle to prevent wedging of the male shaft and the female shaft, wherein each of the spline ends is an axial end and contacts an inner wall of one of the plurality of stakes to define an interface between the stakes and the spline ends as a hard stop interface, wherein the hard stop interface is formed by an interior surface of the female shaft.

2. The method of claim 1, further comprising circumferentially spacing the plurality of stakes from each other with a plurality of circumferentially spaced stake forming features on the step of the stake forming tool aperture.

3. The method of claim 1, wherein each of the spline ends of the male shaft form an angle of 90 degrees relative to a longitudinal direction of the splines.

4. The method of claim 1, wherein the step located within the stake forming tool aperture separates the stake forming tool aperture into a first segment and a second segment.

5. The method of claim 1, wherein the stake forming tool comprises a two-piece assembly that define the stake forming tool aperture in an assembled condition.

6. The method of claim 5, wherein at least one of the two-piece assembly includes at least one locating feature to assemble the stake forming tool in a desired orientation.

\* \* \* \* \*